United States Patent [19]

Thomas

[11] Patent Number: 5,395,417
[45] Date of Patent: Mar. 7, 1995

[54] APPARATUS AND PROCESS USED IN WORKING WINDROWED INGREDIENTS TO PRODUCE PRE-WET CYCLE MUSHROOM COMPOST

[75] Inventor: Thomas M. Thomas, Airdrie, Canada

[73] Assignee: Double T Equipment Manufacturing Ltd., Airdrie, Canada

[21] Appl. No.: 9,280

[22] Filed: Jan. 26, 1993

[51] Int. Cl.$^6$ .............................................. C05F 9/04
[52] U.S. Cl. .............................................. 71/5; 71/8; 71/9; 71/901; 241/192; 435/287; 422/184
[58] Field of Search ............... 71/8, 9, 901; 422/184; 241/192; 435/287

[56] References Cited

U.S. PATENT DOCUMENTS

| | | | |
|---|---|---|---|
| 3,369,797 | 6/1966 | Cobey | 259/28 |
| 3,985,305 | 10/1976 | Williamson et al. | 241/101.7 |
| 4,157,164 | 6/1979 | Helm et al. | 241/101.7 |
| 4,306,686 | 12/1981 | Urbanczyk | 241/101.7 |
| 4,360,065 | 11/1982 | Jenison et al. | 241/191 |
| 4,420,119 | 12/1983 | Johnson | 241/101.7 |
| 4,457,630 | 7/1984 | Pannell | 366/345 |
| 4,475,450 | 10/1984 | Stengel | 100/100 |
| 4,976,095 | 12/1990 | Schnittjer | 56/350 |

FOREIGN PATENT DOCUMENTS

| | | |
|---|---|---|
| 854431 | 10/1970 | Canada . |
| 968965 | 6/1975 | Canada . |
| 1014057 | 7/1977 | Canada . |
| 1175961 | 10/1984 | Canada . |

*Primary Examiner*—Ferris Lander
*Attorney, Agent, or Firm*—Sheridan Ross & McIntosh

[57] ABSTRACT

A mobile machine and process are provided for milling, mixing, wetting and re-forming an initial windrow of vertically layered ingredients used in the pre-wet cycle for producing mushroom compost. In performing these actions, an assembly of toothed drums, rotating in the same direction and arranged along an upwardly and forwardly projecting inclined plane, progressively mills the windrow across its cross-section longitudinally and propels the milled material upwardly and rearwardly so that it drops and mixes to form a vertically blended, transverse product. The product is preferably cross-mixed by auguring it transversely and depositing it at a transfer point, from whence it is elevated and delivered by a conveyor belt, to form a new windrow parallel or collinear with the initial windrow. Water is sprayed on the ingredients in the course of propelling auguring and elevating. A generally uniform blending of the ingredients, coupled with aeration and wetting, creates favorable conditions for contained bacteria to work on the material. The procedure is repeated on each new windrow until the pre-wet cycle is complete.

4 Claims, 5 Drawing Sheets

APPARATUS AND PROCESS USED IN WORKING WINDROWED INGREDIENTS TO PRODUCE PRE-WET CYCLE MUSHROOM COMPOST

FIELD OF THE INVENTION

The invention relates to apparatus and process used in working windrowed ingredients to produce pre-wet cycle mushroom compost.

BACKGROUND OF THE INVENTION

The present invention is concerned with the first stage of preparation of compost for commercial cultivation of mushrooms. This stage is commonly referred to as the "pre-wet cycle".

In the pre-wet cycle, the compost ingredients are positioned on a concrete pad and are repeatedly mixed, aerated and wetted with water at regular intervals over the duration of a retention period. Heretofore this has commonly involved:

placing bales of straw in a windrow on the pad;

depositing nutrient, such as horse and chicken manure, on the bales in pre-determined amounts or proportions using a front end loader. (Typically one might have a formulation of 75% straw, 20% horse manure and 5% chicken manure); and periodically using a front end loader to turn the windrow to induce mixing and aeration. The objectives are to uniformly distribute the ingredients and to convert the mass to a "fluffed up" state so that air can penetrate the mass to assist contained bacteria in carrying out conversion to compost. The fluffed up mixture is wetted thoroughly by spraying it with water. This is done with the objective of adding as much water as the mass can absorb without significant runoff. The bacteria won't attack the straw if it is not moist. However, if there is excessive water run-off, nutrients are lost. It is then necessary to recycle the run-off water.

The temperature of the mass is used as a guide in controlling the frequency of turning the windrow. When the windrow is first turned, the bacteria become active and the temperature of the windrow rises, perhaps to 50°–60° C. When the oxygen in the mass becomes depleted, the bacteria becomes less active. The temperature then begins to drop, indicating that it is time to again turn and work the windrow.

The pre-wet cycle is generally considered complete when the mixture has been adequately subjected to the high temperatures and moisture levels required for the thermophilic bacterial process to accelerate at rapid rates. Moisture content is about 65 to 74 wt. % and any moisture added thereafter would be for maintenance requirements only. The compost's polysaccharides (cellulose and hemicellulose) will have been broken down sufficiently to make the compost mixture soft and porous and ready for the next stage of compost preparation, called phase 1. Phase 1 composting typically involves further mechanical processing to form compact rectangular windrows of compost, or "ricks" which are capable of maintaining self-supporting, vertical side walls.

It typically takes about 14 days to complete the pre-wet cycle, when practised as described.

It is desirable to reduce the duration of the pre-wet cycle. It would be particularly desirable to reduce it to less than 7 days, since the rest of the compost preparation and mushroom growing steps are based on cycles of a week or less. If the extent of blending, aeration and wetting could be improved, then one would expect to see a reduction in the duration of the pre-wet cycle. It is the objective of the present invention to reach that end.

SUMMARY OF THE INVENTION

As stated, the present invention is concerned with reducing the duration of the pre-wet cycle in the preparation of mushroom cultivation compost. In this connection, novel process and apparatus aspects are involved.

The process comprises the following combination of steps:

(a) establishing an initial windrow of vertically layered ingredients provided in the proportions desired for producing pre-wet cycle compost;

(b) milling across substantially the entire end face or cross-section of the windrow, at one time, and advancing longitudinally of the windrow, the milling being conducted along a forwardly-inclined plane at an acute angle relative to ground, whereby a cross-section of the windrow is removed without substantial cave-in of the unmilled portion of the windrow, and propelling the milled material upwardly and rearwardly so that it drops to form a vertically blended, loose, laterally extending product;

(c) conveying this product laterally of the initial windrow and delivering it to a transfer point;

(d) elevating the product from the transfer point and discharging it to form a new windrow extending in the same direction as the initial windrow;

(e) wetting the vertically blended, loose product, preferably as it is conveyed laterally and elevated; and (f) periodically repeating steps (b), (c), (d) and (e) on each new windrow to produce a substantially homogeneous pre-wet cycle composting mixture.

It will be noted that the process combines the actions of:

layering the ingredients to ensure that their proportions are correct within a cross-section;

progressively milling substantially the entire vertical extent of the layered windrow at one time, so that the initial proportions are retained in the milled product;

milling along a forwardly-inclined plane so that cave-ins are minimized, as such cave-ins would result in variations in concentration of ingredients;

mixing the ingredients by propelling them upwardly and rearwardly so that they drop and collect in a now well-mixed, loose, transverse assemblage or "product" whose composition reflects the composition of the initial windrow in the vertical direction;

preferably conveying the milled product laterally and delivering it to a transfer point that is advancing along the line of the initial windrow. This action provides cross-mixing, to cope with potential side to side variation in ingredient distribution (more preferably, the linear assemblage of milled material is conveyed laterally and inwardly from its ends to a central point generally coincident with the axis of the initial windrow);

elevating the milled, mixed and cross-mixed product and depositing it to form a new windrow;

preferably wetting the linear assemblage while it is in a "fluffed up" or loose state in the course of being propelled rearwardly conveyed laterally and elevated; and repeating the process with each new windrow until the pre-wet cycle is complete.

By combining these actions and their effects, a relatively high order of blending of the ingredients and moistening and aerating them has been achieved. As a result, the pre-wet cycle has been reduced to about 5 days from 14 days.

In order to conduct a pre-wet cycle process in the above described manner, applicant has developed a novel machine. The machine is adapted to advance longitudinally through the initial windrow and, in one pass, carry out the milling, mixing, cross-mixing, elevating and wetting actions. The machine comprises:

a mobile, driven, wheeled carriage;

a plurality of toothed drums, rotating in the same direction and arranged along a forwardly inclined plane, said drums being adapted to substantially cover the entire cross-section of the windrow, for milling longitudinally substantially the entire cross-section at one time and propelling the ingredients upwardly and rearwardly, so that they drop and mix to form a transverse assemblage or product;

means for receiving the assemblage and conveying it laterally to deposit it at a transfer point, thereby cross-mixing the ingredients in a transverse direction;

means for elevating the ingredients from the transfer point and depositing them to form a new windrow; and preferably, means, associated with the lateral conveyance and elevating means, for wetting the ingredients between the milling and new windrow-forming steps.

In summary then, applicant has provided a machine and process whereby a vertically layered preparation of composting ingredients, in a windrow form, may be continuously milled and mixed to yield a loose product comprising the ingredients having substantially the proportions present in a vertical section of the windrow, cross-mixed to distribute the ingredients substantially uniformly in a transverse direction, elevated and deposited to form a new windrow and, preferably, wetted with water in the course of propelling the milled ingredients rearwardly, cross-mixing and elevating.

At this point it is useful to clarify or define some of the terminology that has been used in describing the invention. The term "milling" means penetrating the windrow with the teeth or tines of a rotating drum or equivalent and removing the windrow material in discrete portions. As an example, multiple stalks of straw, tightly compressed in a bale, will be physically separated from the bulk of the bale and from each other. (Milling should be conducted, however, to minimize comminution of the material.) The term "inclined plane", used in describing the locus of milling, is to be given a broad interpretation. It is intended to cover an assembly in which a plurality of vertically spaced milling drums are provided with the upper drum(s) being in advance of the lower drum(s) and their milling surfaces work in a common plane or close to a common plane.

DESCRIPTION OF THE DRAWINGS

The detailed description, following, makes reference to the accompanying illustrations which describe one preferred embodiment of the invention, listed as follows.

DESCRIPTION OF THE PREFERRED EMBODIMENT

Figure 1:
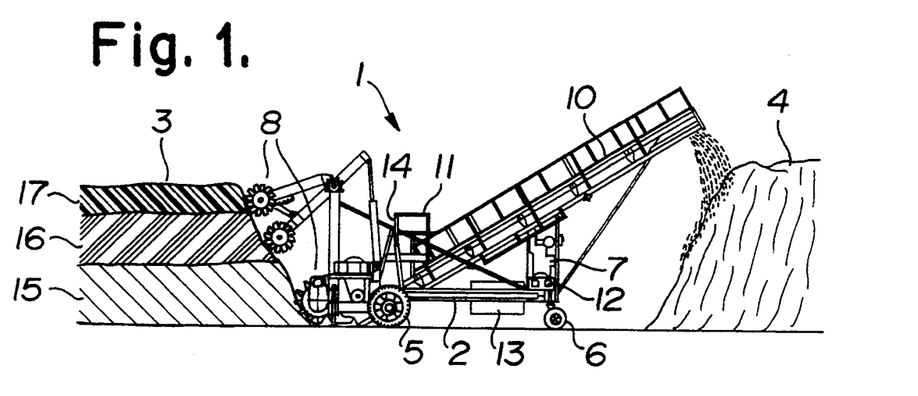
FIG. 1 is a side elevation of a machine processing a feed windrow and discharging a new windrow, practising the method of the invention.
Figure 2:
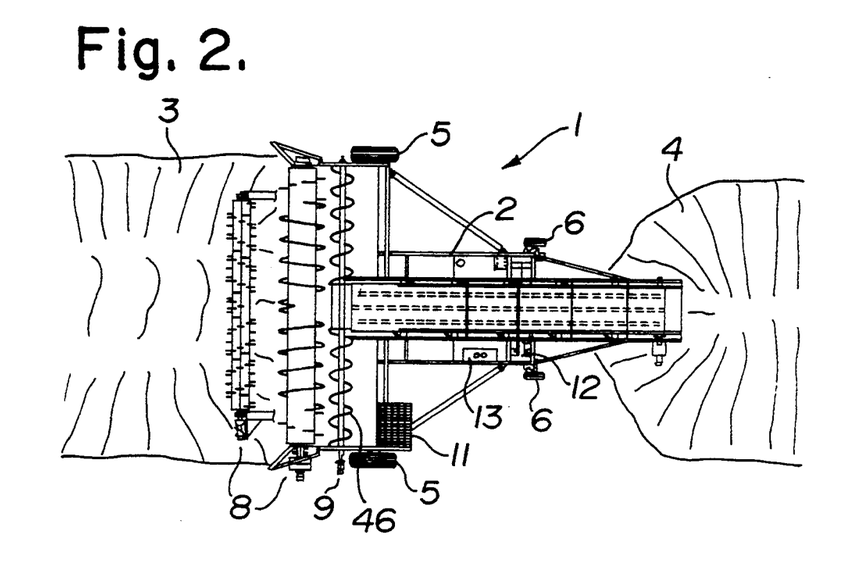
FIG. 2 is a plan view of the machine according to FIG. 1.

Referring to FIGS. 1 and 2, the invention comprises a machine 1 having a length of 34 feet and a width of 23½ feet. The machine 1 is adapted to process a vertically layered feed windrow 3 and to form a new windrow 4.

The machine 1 comprises a structural frame 2 for supporting and mounting drive wheels 5, rear wheels 6, power plant 7, milling assemblies 8, a cross-mixing auger 9 and a discharge conveyor 10.

The conveyor 10 establishes the height of the machine 1 at about 17½ feet.

An operator platform 11 is provided at an elevated position, to enable visual operation of the milling operation.

The machine 1 is designed to travel at up to 50 feet/minute and during processing advances at about 5 feet/minute.

The powerplant 7 is mounted on the frame 2 to drive associated pumping means powering the driving wheel motors, milling assembly componentry, additional power transmission equipment and various fluid pressure operated cylinders. In the preferred embodiment, the powerplant 7 is a 200 Hp diesel engine coupled with a conventional hydraulic pump 12, reservoir 13 and associated hardware, which in turn are coupled to hydraulic motors and cylinders of conventional design, described in context later in the description. Hydraulic controls 14 are available, on the platform 11, for independently controlling each of: the machine steering means, preferably accomplished by the independent control of the driving wheels 5; the milling assembly 8 components; the cross-mixing auger 9; and the discharge assembly 10.

The orientation of the machine is such that the milling assemblies 8 are forward mounted, facing the feed windrow 3 to be processed and direction of advance, and the discharge assembly 10 is rearward projecting. An operator, positioned on the platform 11 would face forward, viewing the milling assemblies 8 and the feed windrow 3, thus defining a left and right side of the machine.

In operation, the machine 1 is first advanced into an initially prepared feed windrow 3 of vertically layered compost ingredients provided in predetermined proportions. A typical windrow may be comprised of 75% straw, 20% horse manure and 5% chicken manure. Preferably, the feed windrow is initially prepared by laying down a base row of straw bales 15, heaping horse manure 16 on the top of the straw, and finally depositing chicken manure 17 thereupon.

The proportions of ingredients in a vertical direction are fairly accurate, although they are layered. The proportions along the transverse axis of the windrow tend to vary significantly. The machine 1 is advanced so that its milling assemblies 8 come into contact with the leading face of the feed windrow 3. In operation, the machine processes the windrow ingredients, using milling, mixing, cross-mixing, elevating and discharging and wetting actions to form a new windrow 4 comprised of blended, aerated and wetted composting ingredients.

Figure 3:
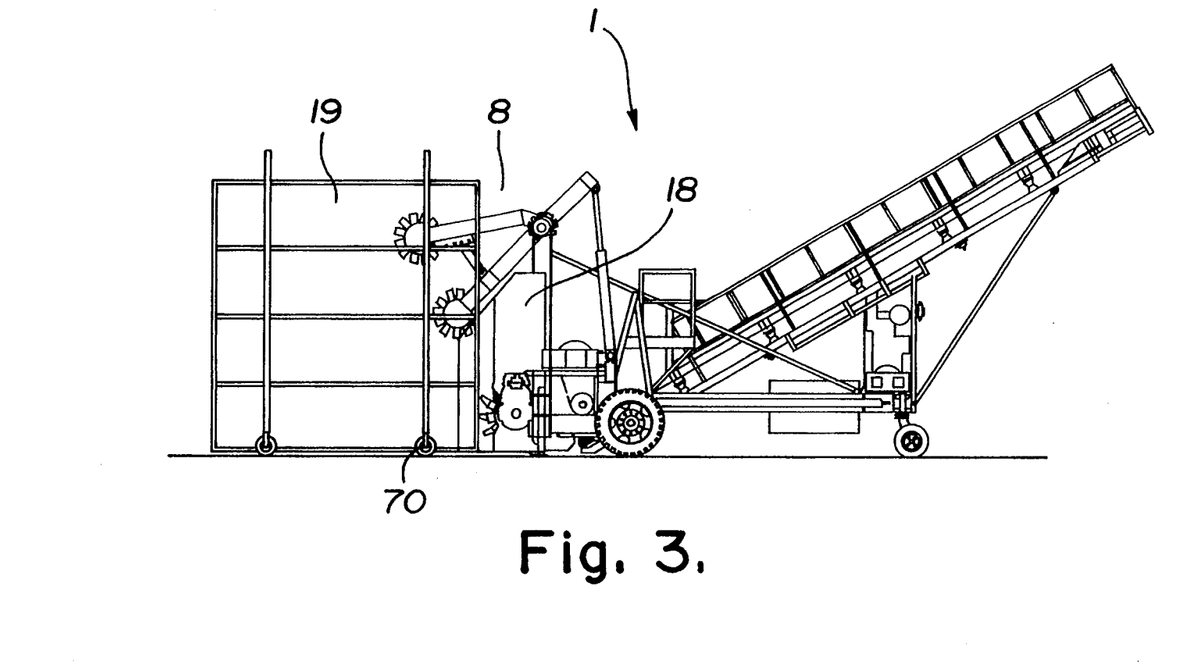
FIG. 3 is a side elevation of a modified form of the machine of FIG. 1.
Figure 4:
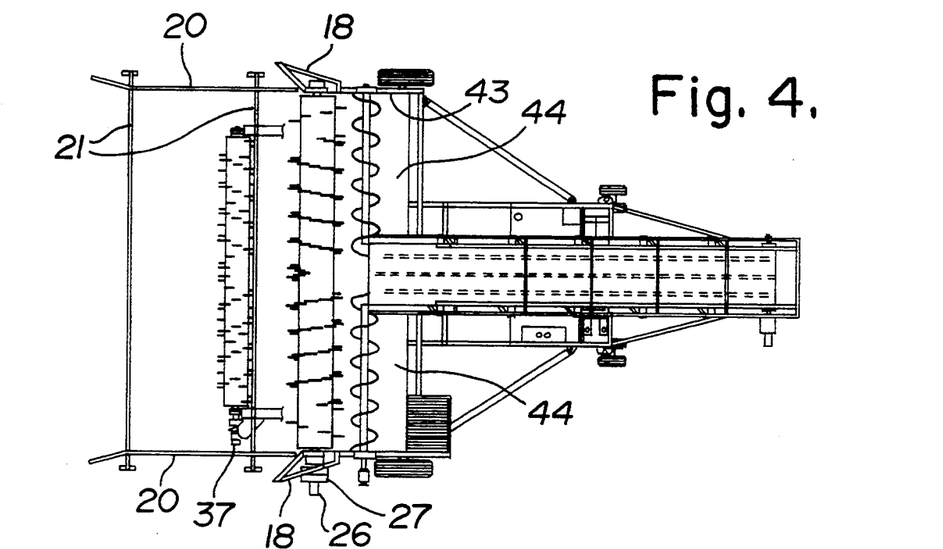
FIG. 4 is a plan view of the machine according to FIG. 3.
Figure 5:
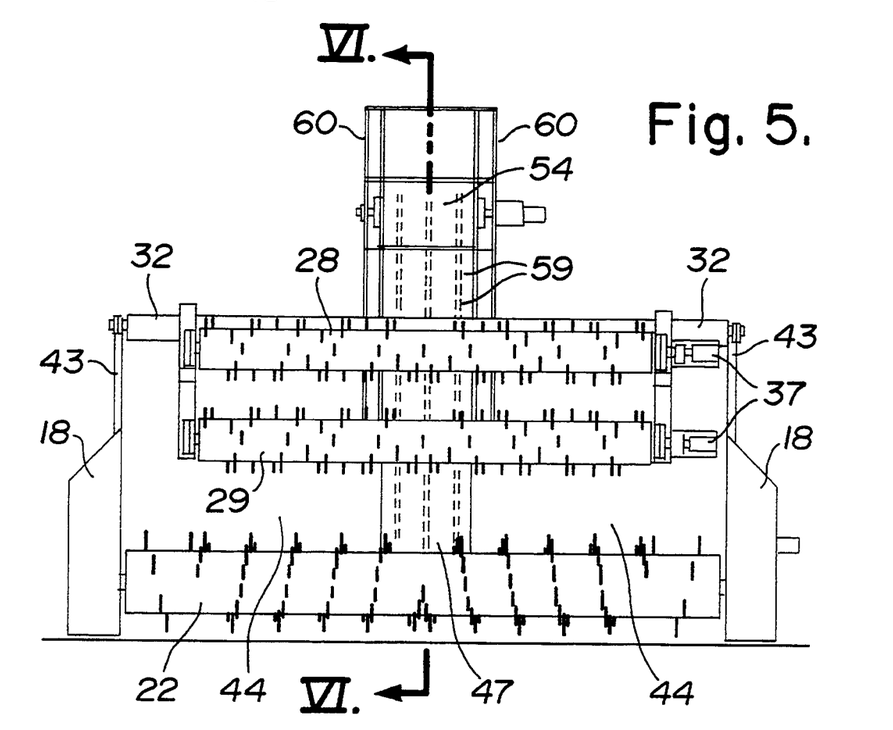
FIG. 5 is a front view of the machine according to FIG. 3.

Referring to FIGS. 3, 4 and 5, the milling assemblies 8 are bordered by forwardly projecting, upstanding fender-like guides 18, provided on each side whereby loose or fallen windrow material is guided thereinto.

In an alternate embodiment, shown in FIGS. 3 and 4, an optional guide extension assembly 19 may be used to enclose a larger portion of the feed windrow 3 should it prove particularly weak and prone to sideways slumping. Best viewed on FIG. 4, the guide extension 19 is comprised of: an additional 12 feet of forward projecting side walls 20, 12 feet high, with structural beams 21 extending transversely thereacross for stabilizing the walls; a mechanical connection to the guide 18 of the machine; and idler wheels 70. The guide extension 19 could optionally be incorporated structurally to form part of guide 18.

The milling assemblies 8 are mounted on the front of the frame 2 and comprise a lower milling drum 22 and a pair of upper milling drums 71 forming a spinner assembly 23.

Figure 7:
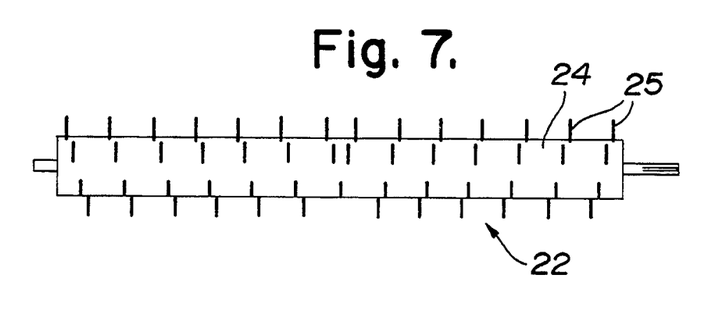
FIG. 7 shows a detail of the milling drum.
Figure 8:
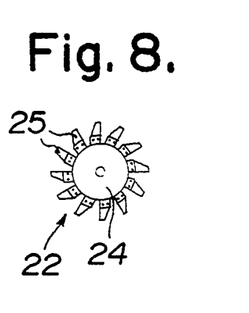
FIG. 8 shows a left end view of the milling drum according to FIG. 7.

The lower milling drum 22 is located near and above the ground surface. The milling drum 22 includes a rigid cylinder 24 fitted with a plurality of tines 25. The cylinder 24 is rotatably mounted transversely in the frame 2. The cylinder 24 is 24 inches in diameter and extends across the full 20 foot width of the machine. The tines 25 are detachably mounted to the cylinder 24 and project radially about 7 to 8 inches. Typically 140 tines 25 are preferably disposed in helical rows in such a manner that the material produced during the milling procedure is induced to move outwardly to the outside edges of the milling drum 22. Optionally, it has been found that arranging the tines 25 in a random pattern provides satisfactory performance.

Any suitable means for actuating the milling drum 22 rotation may be used. For example, a hydraulic motor 26 may be used to drive a speed reducer 27 to provide the milling drum 14 with a nominal rotational speed of 100 rpm.

Figure 9:
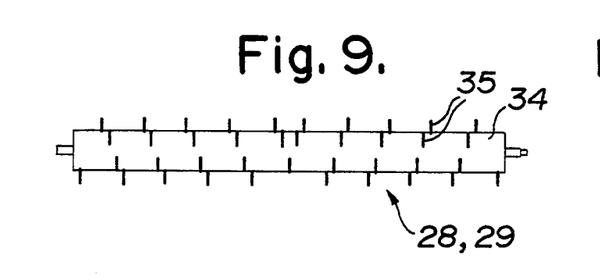
FIG. 9 shows a detail of a typical spinner of the machine.
Figure 10:
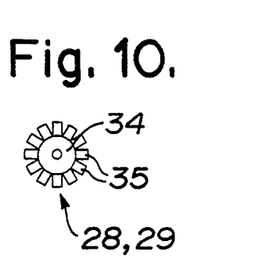
FIG. 10 shows a left end view of the spinner according to FIG. 9.

The spinner assembly 23, comprises upper and lower spinners 28,29 located above and ahead of the milling drum 22. The spinners 28,29 are rotatably mounted in pairs of arms 30, projecting from each end of a pivoting frame 31. The pivoting frame 31 is supported and pivoted on the axis of a structural pivot shaft extending transversely across the top of the machine and rotatably mounted thereupon. The arms 30 are adapted to present the spinners 28,29 in spaced apart relation, projecting the spinners forwardly in parallel, transverse axis orientation, parallel with the axis of the milling drum 22 axis. Each pair of arms 30 forms an acute angle therebetween.

The spinners 28,29 extend across and are centered about the longitudinal axis of the machine. They measure 15 feet in length, being somewhat shorter than the milling drum 22 as they engage the sloped feed windrow 3 at a higher elevation and thus a narrower cross-section. The spinners 28,29 are each comprised of a 16 inch diameter rigid cylinder 34, fitted with a plurality of tines 35. Typically 84 tines 35 on each cylinder 34 are preferably disposed in helical rows in such a manner that the material produced during the milling procedure is induced to move inwardly from the outside edges of the spinners 28,29. The tines 35 are fixed directly to each cylinder 34, projecting radially about 6 inches. The pivoting frame 31 is further fitted with a lever arm 33 mounted opposite to the arms 30. The lever arm 33 is actuated by a hydraulic actuator 36, providing variable vertical positioning of the spinners 28,29; said spinners remaining in fixed, spaced apart relation, affording the upper spinner 28 range-of-motion access to the top of the feed windrow 3, and the lower spinner 29, range-of-motion access to a position near and vertically above the milling drum 22. The axes of the lower spinner 28 and upper spinner 29 may be manipulated, by the actuator 36, into nearly collinear alignment with the axis of the milling drum 22, forming a milling plane inclined forwardly at an acute angle, as referenced to the direction of milling advance. The spinners 28,29 are actuated by hydraulic motors 37 to rotate each of the spinners 28 and 29 independently at nominal speeds of 210 rpm.

The milling drum 22 processes the entire width of the lower portion of the feed windrow 3, throwing milled material 38 rearwardly and upwardly thereover. The upper and lower spinners 28,29 are simultaneously milling medial and upper portions of the feed windrow 3, forming a forwardly inclined plane across the entire windrow cross-section, at an acute angle relative to the direction of milling advance. If the feed windrow 3 is of significant height, the spinners 28,29 may be manipulated by sweeping the pivoting frame 31 to mill a greater portion of the windrow. The spinners 28,29 also act to throw milled material 39 rearwardly and upwardly. As portrayed in FIG. 6 the rotation of the milling drum and the spinners 28,29 is clockwise as viewed from the left side. The throwing action mixes the milled materials 38,39 forming a combed stream 40, further providing intimate contact of composting ingredients and oxygen bearing air, essential for aerobic biological activity.

The simultaneous milling of the entire cross section of the feed windrow 3 at a forwardly inclined prevents significant collapse of the separate ingredients 15,16,17 layered in the feed windrow 3. This maintains the original predetermined proportions during the milling operation. Collapse of the feed windrow 3 ingredients could result in unfavourable variations in the proportions; for example, being too rich in one ingredient for a period and then changing to a lean condition when the milling continues where the overabundance of ingredients had previously collapsed from. The milling operation is preferably performed without excessive comminuting of the ingredients as this is found to be disadvantageous in the composting process.

Figure 6:
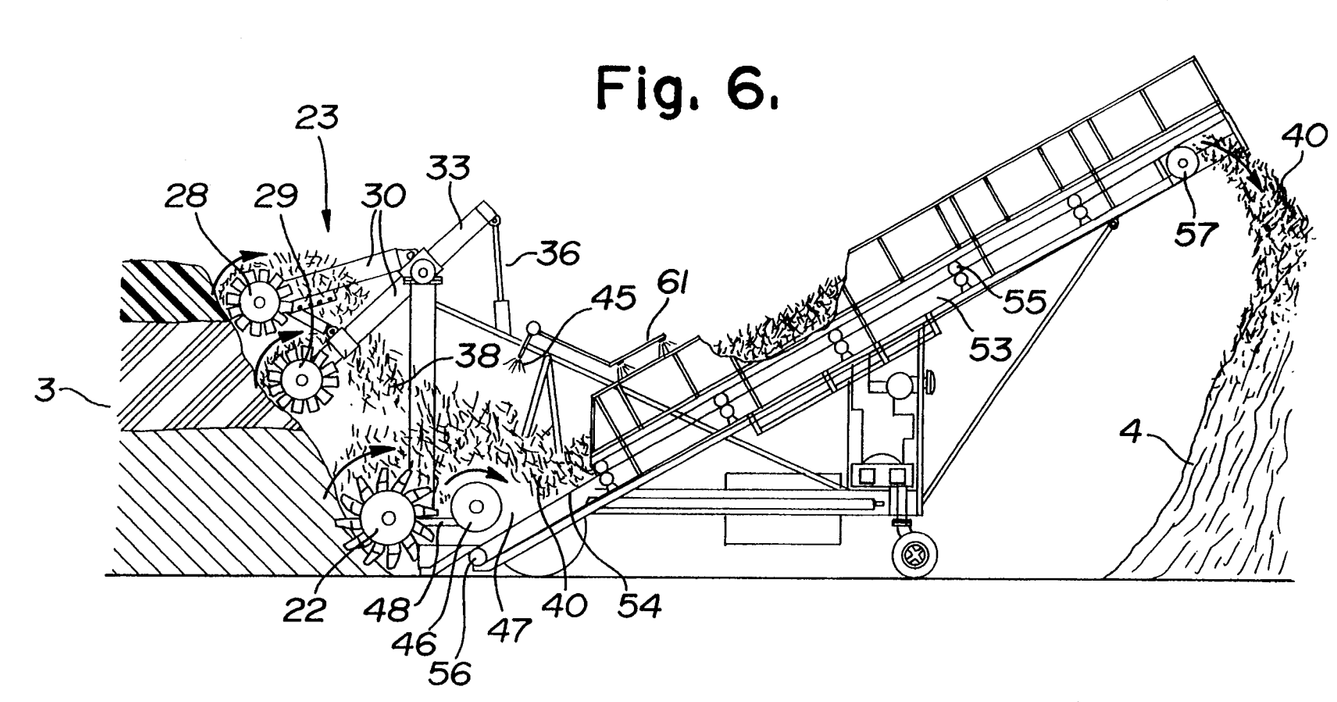
FIG. 6 is a side sectional view of the machine, sectioned on lines X—X of FIG. 5, showing the processing path of the milled material and location of water sprays.

Referring to FIG. 6, a scraper 41 is provided below and slightly rearward of the milling drum 22. The scraper 41 operates in a pivoting action, maintaining a position near and above ground level to catch missed material and gather it until it is re-entrained by the rotary action of the milling drum 22.

The milled material 40 is captured within a rearwardly located containing space 42 defined by three upstanding planes formed by side walls 43, and a transverse, two part backing wall 44 which slopes steeply upwards and rearward. The containment space 42 is open-topped, and open-sided forwards facing the milling drum 22. The milled material 40 falls directly upon, or is directed downwards, by gravity, the side walls 43, and the backing walls 44 into the cross-mixing auger 9, located at the base of the backing wall 44.

A first array of water spray nozzles 45 are distributed along a transverse supply header to apply moisturizing water to the milled material as it moves from the milling assemblies 8 into the cross-mixing auger 9. The water addition rate may be adjusted by the operator. The water is typically supplied from a stationary, pressurized supply means and flexible hose connection to the machine (not shown).

Figure 11:
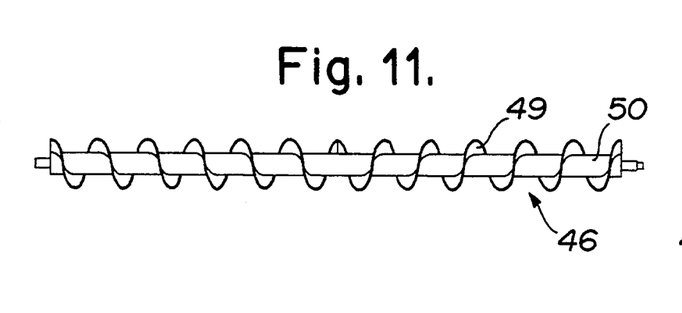
FIG. 11 shows a detail of the auger of the machine.
Figure 12:
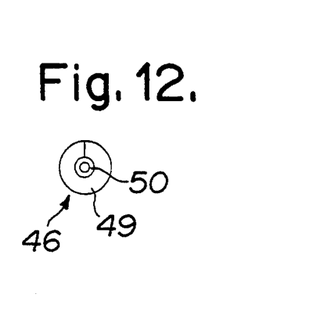
FIG. 12 shows a left end view of the auger according to FIG. 11.

The cross-mixing auger 9 transports milled material 40 laterally and inwardly from both extreme sides, to a substantially central transfer point 47. The auger 9 acts in cooperation with a lower plate 48 which is located beneath the auger 9. The lower plate 48 acts in part as a trough beneath the auger 9 and also to prevent milled material 40 from bypassing the auger 9 and falling directly to the ground surface beneath the machine. The auger 9 comprises of helical flights 49 disposed on a transverse mounted shaft 50, extending 20 feet across the width of the machine. The auger is located at about the same elevation, near to and rearward of the milling drum 22. The shaft 50 is fabricated from an eight inch pipe, upon which are attached the 1 to 1 pitch, 20 inch diameter flights 49. The flights 49, disposed either side of the auger 9 mid-point are of opposite hand to effect the preferred inward transport feature. A drive means in the form of a hydraulic motor 51 is located at the auger shaft end to drive the auger in clockwise rotation as viewed in FIG. 6, directly or through a chain drive assembly 42, at nominal speeds of 400 rpm.

The auger 9 conveys milled material 40, as received, laterally and inwardly towards the transfer point 47 thereby mixing transverse variations in mixture proportions that may be present in the feed windrow 3. The material is directed through the transfer point opening 47 onto the discharge assembly 10.

The discharge assembly 10 preferably comprises a stacking belt conveyor 53, but may also consist of a bucket elevator or similar means. The belt conveyor 53 is inclined rearwardly and upwards at a steep angle (about 30°), minimizing the length of the machine 1. The belt conveyor 53 is of conventional construction, comprising an endless belt 54, running at about 300 feet/min, troughing idlers 55, tail pulley 56, head pulley 57 and hydraulic drive means 58 mounted on said head pulley 57; the tail pulley 56 being located beneath the transfer point 46 opening; and the head pulley 57 being elevated to discharge milled material 40 at a height at least equal to the original feed windrow 3. Preferably, cleats 59 or other traction enhancing devices are mounted on the belt surface. Stationary side walls 60 are located on either side and extend upwards beyond the belt 54 surface, which permit deep, milled material 40 loading.

Adjustable water sprays 61 are distributed along the elevating belt conveyor 53 to complete the wetting water requirements.

In use, the machine 1 continuously processes the feed windrow 3 until none remains. The processing of the initial layered feed windrow 3 is referred to as the first pass. Note that the new windrow 4 has been shifted in physical position, one machine length rearward, with respect to the original feed windrow 3 position. The machine 1 is then steered in a 180° turn to commence re-processing the windrow. The foregoing milling procedure is repeated, now advancing in the opposite direction, noting that the windrow being created is being formed on the same physicals location of the original windrow 3. This re-processing of the windrow is referred to as the second pass. The need for only one machine length of area at the trailing end of a windrow illustrates the minimal space requirements for processing.

Generally, the majority of the water required for optimal biological activity is provided in the first and second passes and may be added at a rate of about 100 US gpm.

As biological activity reduces due to lack of oxygen or nutrients, additional processing passes may be required to reaerate and redistribute the composting mass. Typically, it has been determined that third and fourth passes are required to complete the preparation of the Pre-Wet compost. Generally reduced amounts of wetting water may be added in these later passes to restore moisture lost due to evaporation, or to meet additional demands due to increased acceptance for absorbtion.

To clearly highlight the beneficial effects of the present invention and the advantages to a commercial mushroom cultivator, an example is presented.

A test program was performed at the site of a commercial mushroom grower. Typically, for this particular grower, the pre-wet composting cycle required 14 days to complete, at which point it was moved onto Phase 1 processing. Prior to the implementation of the present invention, the commercial grower was using a conventional pre-wet system, requiring working with a minimum of 2 loaders, and associated labour, and two batches of composting heaps at staggered stages of completion to allow one batch of finished compost to be ready for phase 1 composting, once every week. Both batches were located on a common secure concrete pad.

Upon commencing use of the method and apparatus of the invention, pre-wet compost was being prepared from initial windrow to final pre-wet compost product in less than one week. Double batches of compost were no longer required, effectively doubling the secure area upon which pre-wet compost could be prepared. The quantity of finished pre-wet compost product produced every week rose from about 200 tons/week to a new production level of 450 tons/week. Loader use and the associated labour of operating and maintenance was significantly reduced. Only one loader and labour was needed, being somewhat reduced in spite of increased production rates. Increased production and reduced labour are directly resultant from the improved method and apparatus of the invention.

The embodiments of the invention in which an exclusive property or privilege is claimed are defined as follows:

1. A method of preparing a pre-wet cycle composting mixture for cultivating mushrooms which comprises:
   (a) establishing an initial windrow of vertically layered ingredients, in predetermined proportions;
   (b) milling the windrow across its cross-section longitudinally using a plurality of toothed drums rotating upwardly and rearwardly and arranged along a plane inclined forwardly at an acute angle relative to ground, so that substantially an entire cross-section of the windrow is removed at one time without substantial cave-in of the unmilled portion of the windrow;
   (c) propelling the milled ingredients upwardly and rearwardly through the air so that they drop to form a proportionately vertically blended, loose, laterally extending product;
   (d) cross-mixing the product by conveying it laterally of the windrow and delivering it to a transfer point; and
   (e) elevating the product from the transfer point and depositing it to form a new windrow extending parallel or collinearly with the initial windrow;
   (f) wetting the product in the course of at least one of the propelling, cross-mixing and elevating steps.

2. The method as set forth in claim 1 wherein:
   the product of step (c) is cross-mixed by conveying it laterally and inwardly to a transfer point that is central of the initial windrow.

3. Apparatus for preparing a pre-wet cycle composting mixture which is arranged in a windrow of vertically layered ingredients of predetermined proportions for cultivating mushrooms comprising:
   (a) a mobile, driven frame means;
   (b) means, carried by the frame means, for progressively longitudinally milling a windrow across substantially its entire cross-section at one time along a plane inclined forwardly at an acute angle relative to ground and for propelling the milled material upwardly and rearwardly through the air so that it drops to form a proportionately vertically blended, loose, laterally extending product said means comprising a plurality of toothed drums, adapted to be rotated in an upwardly and rearwardly directed direction, said drums being arranged to conduct their milling action along the forwardly inclined plane;
   (c) means, carried by the frame means, for receiving and containing the product;
   (d) means, associated with the means (c), for conveying the product laterally and delivering it to a transfer point;
   (e) means, carried by the frame means, for receiving the product at the transfer point, elevating it and depositing it to form a new windrow extending parallel or collinearly with the initial windrow; and
   (f) means for wetting the product with water.

4. The apparatus as set forth in claim 3 wherein:
   the means (c) comprises an open-topped trough;
   the means (d) comprises auger means disposed in the trough and adapted to convey the product inwardly from the ends of the trough to a central transfer point; and
   the means (e) comprises upwardly and rearwardly inclined conveyor belt means.

* * * * *